US009756300B2

(12) United States Patent
Sheng

(10) Patent No.: US 9,756,300 B2
(45) Date of Patent: Sep. 5, 2017

(54) COMPACT OPTICAL PROJECTION APPARATUS

(71) Applicant: Texas Instruments Incorporated, Dallas, TX (US)

(72) Inventor: Zhongyan Sheng, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 66 days.

(21) Appl. No.: 14/537,036

(22) Filed: Nov. 10, 2014

(65) Prior Publication Data

US 2015/0138446 A1    May 21, 2015

Related U.S. Application Data

(60) Provisional application No. 61/906,674, filed on Nov. 20, 2013.

(51) Int. Cl.
*H04N 9/31* (2006.01)
*G03B 21/20* (2006.01)
(Continued)

(52) U.S. Cl.
CPC ......... *H04N 9/3173* (2013.01); *G03B 21/008* (2013.01); *G03B 21/2066* (2013.01);
(Continued)

(58) Field of Classification Search
CPC ........ G03B 21/10; G03B 21/20; G03B 21/28; G03B 27/18; H04N 9/31; H04N 5/74
See application file for complete search history.

(56) References Cited

U.S. PATENT DOCUMENTS 5,309,188 A    5/1994   Burstyn
6,471,356 B1   10/2002  Gohman et al.
(Continued)

OTHER PUBLICATIONS

Wikipedia, "Relay Lens," retrieved from world wide web, uniform resource locator: http://en.wikipedia.org/wiki/Relay_lens on Oct. 16, 2014.
(Continued)

*Primary Examiner* — Sultan Chowdhury
*Assistant Examiner* — Danell L Owens
(74) *Attorney, Agent, or Firm* — Michael A. Davis, Jr.; Charles A. Brill; Frank D. Cimino

(57) ABSTRACT

A compact optical projection apparatus. An apparatus for light projection includes at least one illumination device; a cover prism including a curved surface positioned to receive illumination light rays and a total internal reflection surface positioned to internally reflect the light rays towards an asymmetric reflector surface positioned opposite the total internal reflection surface, the asymmetric reflector surface configured to reflect the received light rays out of the cover prism at an emitter side of the cover prism; a spatial light modulating the illumination light rays with image data to form image light rays; a reverse total internal reflection (RTIR) prism positioned between the spatial light modulator and the emitter side of the cover prism and further comprising a total internal reflection surface configured to totally internally reflect the image light rays out of the RTIR prism into a light projection device. Additional apparatus are disclosed.

19 Claims, 11 Drawing Sheets

(51) Int. Cl.
  *G03B 21/28* (2006.01)
  *G03B 21/00* (2006.01)
  *G02B 17/04* (2006.01)
  *G02B 19/00* (2006.01)

(52) U.S. Cl.
  CPC ........... *G03B 21/28* (2013.01); *H04N 9/3102* (2013.01); *H04N 9/3176* (2013.01); *G02B 17/04* (2013.01); *G02B 19/0023* (2013.01); *G02B 19/0066* (2013.01); *G03B 21/2013* (2013.01); *G03B 21/2033* (2013.01)

(56) References Cited

U.S. PATENT DOCUMENTS

| | | | |
|---|---|---|---|
| 7,360,905 | B2 | 4/2008 | Davis et al. |
| 2003/0107816 | A1* | 6/2003 | Takagi ................ G02B 17/004 359/631 |
| 2008/0259287 | A1 | 10/2008 | Liao et al. |
| 2009/0190101 | A1* | 7/2009 | Alasaarela ............... G02B 5/04 353/81 |
| 2011/0122374 | A1 | 5/2011 | Maeda |
| 2012/0293774 | A1* | 11/2012 | Inoue .................... G02B 13/04 353/31 |
| 2012/0300180 | A1 | 11/2012 | Jeon et al. |

OTHER PUBLICATIONS

Texas Instruments, Inc., "DLP PICO Processor 2607 ASIC," www.ti.com, DLPS030B, Dec. 2013, Revised Jan. 2014, pp. 1-43, product data sheet, retrieved from world wide web, uniform resource locator: http://www.ti.com/lit/ds/symlink/dlpc2607.pdf, on Nov. 10, 2014.

Texas Instruments, Inc., "DLP System Optics," www.ti.com, DLPA022, Jul. 2010, pp. 1-25, Application Report, retrieved from world wide web, uniform resource locator: http://www.ti.com/lit/an/dlpa022/dlpa022.pdf, on Nov. 10, 2014.

Texas Instruments, Inc., "DLPA2000 PMIC/LED Driver for DLP2010 (0.2 WVGA) DMD," www.ti.com, DLPS043, Jun. 2014, production data, retrieved from world wide web, uniform resource locator: http://www.ti.com/product/DLPA2000/datasheet/application_and_implementation#DLPS0432579 on Nov. 10, 2014.

Extended European Search Report for EU 14863400.9 dated Jun. 27, 2017.

* cited by examiner

COMPACT OPTICAL PROJECTION APPARATUS

RELATED APPLICATIONS

This patent application claims priority to U.S. Provisional Application Ser. No. 61/906,674, entitled "Compact Optics for Projection," filed Nov. 20, 2013, which is hereby incorporated by reference herein in its entirety.

TECHNICAL FIELD

Aspects of the present application relate generally to the use of compact optical devices for image projection. Applications of compact optical projection devices include portable compact projectors. Additionally, increasingly compact optical projection devices are being provided (or are planned to be provided) as embedded compact optical projectors used for smartphones, cell phones, tablet computers, laptop computers, cameras, video recorders or camcorders and the like, as well as for personal computers. Additional applications include displays such as are used in wearable devices, and "heads up" displays for cockpits, automobiles, and the like. By adding an embedded compact optical projector to portable personal devices, the user no longer needs to carry a separate dedicated projector. The user can use the embedded compact optical projector with any surface as a display screen for use in such activities as watching video, displaying still photography, showing slides for presentations, personal entertainment or group entertainment. The compact embedded optical projector is particularly well suited for times when the user has only one portable device available, for example while traveling, to view video and still images without carrying a dedicated projector, DVD player, portable television, computer or the like.

BACKGROUND

In projecting images using an optical projector that is configured for a compact size, various lamps, lenses, reflectors and spatial light modulators such as digital micro-mirror devices (DMD), liquid crystal display (LCD) and liquid-crystal-on-silicon (LCoS) devices are often used. The optical projection systems are formed in two parts, an illumination system for generating and collecting the light rays needed to illuminate an image, and a projection system for collecting the illuminated image light rays into a projection lens and then projecting the final image out of the compact optical device. A spatial light modulator device receives the illumination light rays from the illumination system, modulates the light received with image data, and transmits image light rays for projection to the projection system. However, in the prior known systems, substantial area is required for the illumination system, the spatial light modulator, the projection system, and the light path needed to project an image from a compact optical device.

FIG. 1 depicts in a simple illustration a typical application for a compact optical projector in the form of a smartphone 10. In FIG. 1, the smartphone 10 has a chassis or body 11 with a thickness labeled 'T' in FIG. 1, a touchscreen 13 for displaying information and for receiving user inputs, and a projection lens 17 for an embedded compact optical projector within smartphone 10 (the embedded compact optical projector is not visible in FIG. 1) which is shown projecting a beam of light 15.

There are several challenges associated with providing an embedded optical projection feature in a device such as smartphone 10 using prior known solutions. These portable devices are increasingly being made smaller and in particular, thinner. The thickness 'T' is constantly being reduced, for example, it may be less than 7 millimeters in current devices. Further challenges are presented by the overall small size of the device and by the fact that within that portable device many functions are provided that also require circuit board and system space. These functions can include, without limitation, cellular phone integrated circuits, WiFi and Bluetooth integrated circuits, various input and output features such as a compact flash card or USB card ports, SIM card sockets, front and back side cameras, speakers, microphones, audio and vibratory alert functions, various external input and output jacks, circuitry for GPS, motion detection such as accelerometers and gyroscopes, and the like. In addition the device 10 requires various processors and controllers and data storage such as static, non-volatile and dynamic memory, all of which require space within chassis 11. Further the device 10 often operates on battery power, so that the brightness from an embedded projector must be maximized for a small power budget. The projector efficiency performance metric, which can be for example lumens/Watt, must be optimized. The prior known solutions for compact optical projection systems fail to provide adequate performance in a size that is compatible with current and future portable device sizes and with available battery capacities.

In order to further illustrate the problems associated with the prior known solutions, FIG. 2 depicts in a system block diagram a top view or plan view of a prior known projection system 40. System 40 is configured using conventional reverse total internal reflection (RTIR) projection architecture. In an RTIR architecture, a reverse total internal reflection (RTIR) prism is used in a projection path between a spatial light modulator and the projection optics, as is further described below.

In the projection system 40, illumination is provided as shown as provided by the use of red, green and blue (RGB) LEDs 42, 43 and 46. However, alternative illumination sources can also be used, such as incandescent lamps with reflectors, single lamps with color wheels, laser, laser-phosphor illumination, and the like. The LEDs can include an optical coating or collimating optics 41 which act to collect and collimate the light output by the LEDs. Also, as illustrated in FIG. 2, two LEDs 42 and 46 are shown on a single integrated device, these can be the red and green LED devices, for example, while the blue LED 43 is provided as a separate component. In alternative systems three individual LEDs are used, and two dichroic plates in the form of an X shape can be used to combine the three colors (RGB) into an illumination source. In the particular example shown in FIG. 2, dichroic plate 48 reflects the light from red LED 46 at one surface, reflects the light from green LED 42 at a second surface, and passes the light from blue LED 43 through and to the illumination path. Note that in alternative arrangements, many LEDs can be used or multiple LEDs can be used instead of one LED for each color.

In FIG. 2, an additional collimator 49 for example is placed between the LEDs 42, 46 and the dichroic plate 48. Collimators are well known and perform the function of reducing the beam diverging angle. Integrator 47 is placed in the illumination path after the dichroic plate. The integrator 47 may be a "flys-eye" integrator (also referred to as a lens array), or a rod integrator or tube integrator. The integrator produces a more homogeneous light beam which can then be transmitted through one or more relay lenses such as relay 51. The relay optics such as 51 extend the length of the illumination path.

Mirror 61 is provided and in this particular example arrangement, folds the illumination light path. This reflective fold mirror also enables the illumination light rays to reach the spatial light modulator 73, which in this example is a digital micro-mirror device, at an angle. Because the digital micro-mirror (DMD) 73 modulates the light by tilting reflective mirrors, the illumination rays must strike the mirrors at an angle. Use of the folding mirror 61 makes control of the angle of the illumination rays to the spatial light modulator 73 easier to achieve. Additional relay optics such as 52 can be placed between the mirror 61 and the DMD 73.

Use of a reflective spatial light modulator such as DMD 73 requires that the illumination light rays from mirror 61 that are entering the DMD package and the reflected image light rays leaving the mirrors in spatial light modulator 73 be physically separated to avoid interference, as can be seen by examining FIG. 2. As is known in the art, the use of a RTIR prism can separate the incoming rays from the illumination system from the image rays that are being transmitted into the projection optics. U.S. Pat. No. 5,309,188, entitled "Coupling Prism Assembly and Projection System Using Same," which is hereby incorporated by reference in its entirety herein, discloses a prism arrangement using total internal reflection to separate the illumination and projection light paths in a small space. As shown in FIG. 2, wedge prism 75 and TIR prism 76 form a coupling prism that accomplishes the needed separation of the illumination light rays from the image light rays. The image light rays exit prism 76 and are coupled into a projection system that includes elements 54, 56, and 59

FIG. 2 illustrates a space 50 between the path formed by the LED light sources and illumination optics and the path for the projection optics. This space 50 is not used as part of the projection optics but is nonetheless required for the RTIR projection system 40. The space 50 is wasted. In an application for a portable compact optical projector, such as an embedded projector in a smartphone, this use of space is undesirable.

FIG. 3 illustrates in additional detail a block diagram of the optics in a projection path 80 for a prior known system such as that in FIG. 2. As can be seen from FIG. 3, there are several optical components following the spatial light modulator 93, and prism 95, including a space followed by a large field lens 97 and various lenses up to pupil 98, and several magnification lenses and projection lenses including lens 99 following after pupil 98. Accordingly the length 'L' of the optics from the DMD 93 to the output is quite long, a factor that is quite disadvantageous and even prohibitive for embedded compact optical projection systems. Also, the light path followed from the DMD 93 to the output lens 99 has a large height that is larger than the height shown as 'H' of the spatial light modulator, as the light rays extend first upward above the height 'H' as the light moves towards the pupil 98, and then extend downwards as it travels from the pupil 98 outwards, dropping below the bottom of the vertical height 'H' (as indicated by the dashed lines in FIG. 3). In order to maintain all of the lumens available for projection and so improve or maintain efficiency, the system using the prior known projection system 80 must allow extra vertical space for this light path that travels above, and then travels below, the vertical space 'H'. This height requirement in the known prior solutions is also disadvantageous when forming a compact embedded optical projection system, as it increases the space required in order to maintain the brightness from the LED sources throughout the projection system (to conserve the lumens output by the light sources so as to obtain the maximum available brightness at the output).

Improvements in the compact optical projection systems for embedding optical projectors in portable or small form factor devices, such as for embedding optical projectors in smartphones, are therefore needed in order to address the deficiencies and the disadvantages of the prior known approaches. Solutions are needed that reduce the total number of components; reduce the area and space required for the embedded compact optical projectors, and which improve the performance, for example in terms of performance metrics such as brightness in lumens/Watt, while maintaining or improving the image resolution of the embedded compact optical projection systems.

SUMMARY

Various aspects of the present application provide compact optical projection systems and components for compact optical projection. Novel optical prism arrangements are provided which include relay lens functions, total internal reflection, and asymmetric mirror surfaces together in a single optical component or in an integrated optical assembly, reducing the total number of optical components needed and reducing the area and volume needed to implement the compact optical projector.

In one aspect of the present application, an apparatus for image projection includes at least one illumination device; a cover prism including a curved surface positioned to receive illumination light rays emitted by the at least one illumination device, a total internal reflection surface positioned to internally reflect the light rays received through the cover prism towards an asymmetric reflector surface formed within the cover prism and positioned opposite the total internal reflection surface, the asymmetric reflector surface configured to reflect the received light rays back through the cover prism and out of the cover prism at an emitter surface of the cover prism; a spatial light modulator having a surface for receiving illumination light rays from the emitter surface of the cover prism and modulating the illumination light rays with image data to form image light rays; a reverse total internal reflection (RTIR) prism positioned between the spatial light modulator and the emitter surface of the cover prism and having an output surface positioned to allow illumination light rays emitted from the cover prism to travel through the RTIR prism to the spatial light modulator, and further including a total internal reflection surface positioned to receive image light rays reflected from the spatial light modulator and configured to totally internally reflect the image light rays from the output of the RTIR prism into a light projection device; and the light projection device positioned to receive image light rays from the RTIR prism and to project the image light rays from at least one projection lens.

In another aspect of the present application, the apparatus above further includes a wedge positioned between the cover prism and the RTIR prism and configured to transmit light rays from the emitter side of the cover prism into the RTIR prism and towards the spatial light modulator.

In yet another aspect of the present application, the apparatus above is provided wherein the cover prism provides a folded optical path between the illumination device and the spatial light modulator.

In a further aspect of the present application, the apparatus above is provided wherein the curved surface of the cover prism further includes relay optics.

In yet another aspect of the present application, the above apparatus is provided wherein the cover prism is formed of a molded material that is one selected from the group consisting essentially of moldable glass materials and plastics including polycarbonate, PMMA, OCO, polystyrene.

In a further aspect of the present application, the apparatus above is provided, wherein the cover prism further includes a mirror surface formed on a portion of an exterior surface to form the asymmetric reflective surface.

In still another additional aspect of the present application, the apparatus described above is provided wherein the RTIR prism further includes a field lens disposed adjacent the output surface of the RTIR prism. In an additional aspect of the present application, in the apparatus above, the field lens is adhered to the output surface of the RTIR prism, or the two components are merged into a single component made by molding or traditional grinding and polishing.

In yet another aspect of the present application, in the above apparatus, the at least one illumination device further includes an illumination device that is one selected from the group consisting essentially of an LED, incandescent lamp, laser, and laser phosphor.

In still another aspect of the present application, the above described apparatus is provided, wherein the at least one illumination device further includes at least three LEDs, one red, one green and one blue.

In yet another aspect of the present application, the above described apparatus is provided, wherein the light projection device further includes a series of optical elements arranged to form a pupil, and no more than two optical components are disposed in an image light path after the pupil.

In another aspect of the present application, an in-line prism system for optical projection includes a cover prism having a portion that forms a curved surface for receiving illumination light rays from an illumination system, the cover prism further including a total internal reflection surface positioned opposite the portion and configured to reflect illumination light rays across the cover prism to an asymmetric reflective surface formed within the cover prism, the asymmetric reflective surface configured to reflect the illumination light rays back across the cover prism and out of the cover prism; and an RTIR prism positioned to receive the illumination light rays from the cover prism and to emit the illumination light rays to a spatial light modulator positioned adjacent one surface of the RTIR prism. The RTIR prism further includes a total internal reflective surface positioned opposite the spatial light modulator and configured to reflect image light rays received from the spatial light modulator out of the RTIR prism at another surface. In the in-line prism system, the illumination light rays enter the cover prism in a first direction and the image light rays exit the RTIR prism in the same first direction.

In yet another aspect of the present application, the in-line prism system described above further includes a wedge disposed between the cover prism and the RTIR prism In still another aspect of the present application, in the in-line prism system described above, the portion that forms a curved surface of the cover prism further includes an optical relay component.

In a further additional aspect of the present application, in the in-line prism system described above, the cover prism is a molded material that is one selected from the group consisting essentially of moldable glass materials and plastics including polycarbonate, PMMA, OCO, polystyrene.

In still another aspect of the present application, a portable device having an embedded compact optical projection system includes a processor having digital video output signals for display as an image; a spatial light modulator coupled to the processor for converting the digital video output signals into images for projection; at least one illumination source configured to emit illumination light rays; a cover prism positioned to receive the illumination light rays into a curved surface, the cover prism further including a total internal reflection surface disposed to receive the illumination rays and to reflect the light rays at a 90 degree angle, and an asymmetric reflective surface within the cover prism positioned opposite the total internal reflection surface and configured to reflect the illumination light rays back across and out of the cover prism towards a spatial light modulator; the spatial light modulator configured to receive the illumination light rays and for reflecting the illumination light rays modulated with images for projection to form image light rays; an RTIR prism positioned between the cover prism and the spatial light modulator and configured to receive the image light rays through a first surface adjacent the spatial light modulator, the image light rays traveling through the RTIR prism to a total internal reflection surface disposed opposite the spatial light modulator and configured to reflect the image light rays at a 90 degree angle and out of a second surface of the RTIR prism towards projection optics; and projection optics configured to receive the image light rays from the second surface of the RTIR prism and to project the image light rays from the portable device.

In another aspect of the present application, the portable device described above is provided wherein the illumination light rays and the image light rays travel in a same direction and are aligned.

In still another aspect of the present application, the device described above is provided wherein the portable device is one taken from the group consisting essentially of a smartphone, a tablet computer, a portable projector, a wearable projector, a camera, a camcorder and a laptop.

In still another aspect of the present application, the device described above is provided wherein the spatial light modulator is one taken from the group consisting essentially of a digital micro-mirror device and an LCoS device.

Recognition is made in aspects of this application of solutions for providing a compact optical projection system with an in-line architecture. The novel optical prism components disclosed enable the use of fewer components and provide a shorter length optical path with a lower height than for the prior known solutions, thereby advantageously enabling the increased use of embedded compact optical projectors, particularly in small form factor portable devices.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled."

In various aspects of the present application, novel solutions are provided for compact optical projection. In certain aspects of the present application, the optical components of a compact optical projection system are disposed in an "in-line" architecture. That is, the illumination and projection paths are arranged so that light rays from the illumination sources and light rays from the projection optics are traveling in the same plane and are parallel and can be in alignment, so that the compact optical projection system is an "in line" system. In certain aspects of the present application, novel optical components are used to fold the light path twice, and thereby enable the "in line" architecture that is used.

Figure 4:
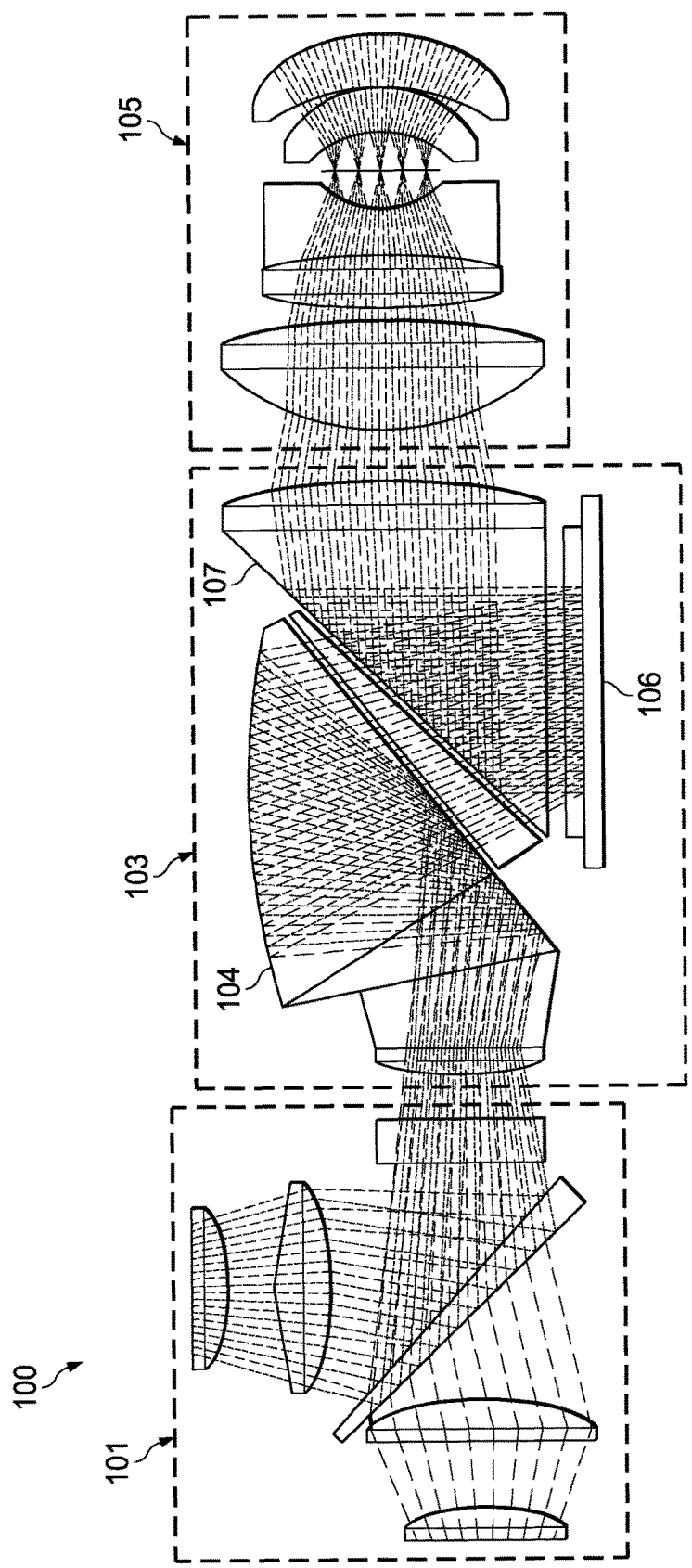
FIG. 4 illustrates in a simplified block diagram an example arrangement for a compact optical projection system incorporating aspects of the present application.

FIG. 4 illustrates, in a system block diagram including lines representing the light ray paths, an example compact optical projection system 100 incorporating aspects of the present application. In FIG. 4, illumination components are placed in an illumination system 101, for example red, green and blue LEDs may be arranged generally to form an illumination beam using a dichroic plate as discussed with respect to FIG. 2, above, the dichroic plate provided to transmit the red, blue and green rays. An integrator device is also provided to form a homogeneous light beam. Various optical components are also provided in a projection optics system 105 that receives the image light rays from a spatial light modulator 106 and projects them outwards from the device.

Importantly, in FIG. 4, a cover prism 104 and RTIR prism 107 are used together to form an in-line optical projection component 103 for transmitting the illumination light from illumination system 101 onto the surface of the spatial light modulator 106, and then transmitting the reflected, modulated light (now including the image for projection) from the spatial light modulator 106 into the projection system 105.

In FIG. 4 the in-line optical component 103 includes a cover prism 104 and an RTIR prism 107. The cover prism 104 can include a relay optical function at the illumination side, the surface where illumination light enters the cover prism 104, a TIR surface disposed opposite the illumination side that reflects the rays at a 90 degree angle, an asymmetric mirrored surface that then reflects the illumination rays at an angle so that the illumination rays exit the cover prism in a direction towards the spatial light modulator 106. The asymmetric mirror surface in cover prism 104 provides anamorphic correction capability that efficiently couples the rays from the illumination path to the projection path in order to compensate the anamorphic effect caused by the oblique incident angle and the prism set. The anamorphic correction provided eliminates the need for another lens element by providing different optical power along different directions, i.e., horizontal direction and vertical direction. The RTIR prism 107 allows separation of the illumination light rays coming into the spatial light modulator 106 and the image light rays reflected from the spatial light modulator 106 for projection. The illumination light rays first transit the RTIR prism 107 to the spatial light modulator 106. The reflected light rays, now modulated by the spatial light modulator 106 to include image data for projection, then strike the internal surface of the RTIR prism 107 opposite the spatial light modulator 106 and are totally internally reflected at a 90 degree angle. The image light rays now exit the RTIR prism 107 towards the projection optics system 105, and in a direction in the same plane as, and aligned with, the illumination light rays coming into the cover prism 104 from the illumination system 101.

Figure 5:
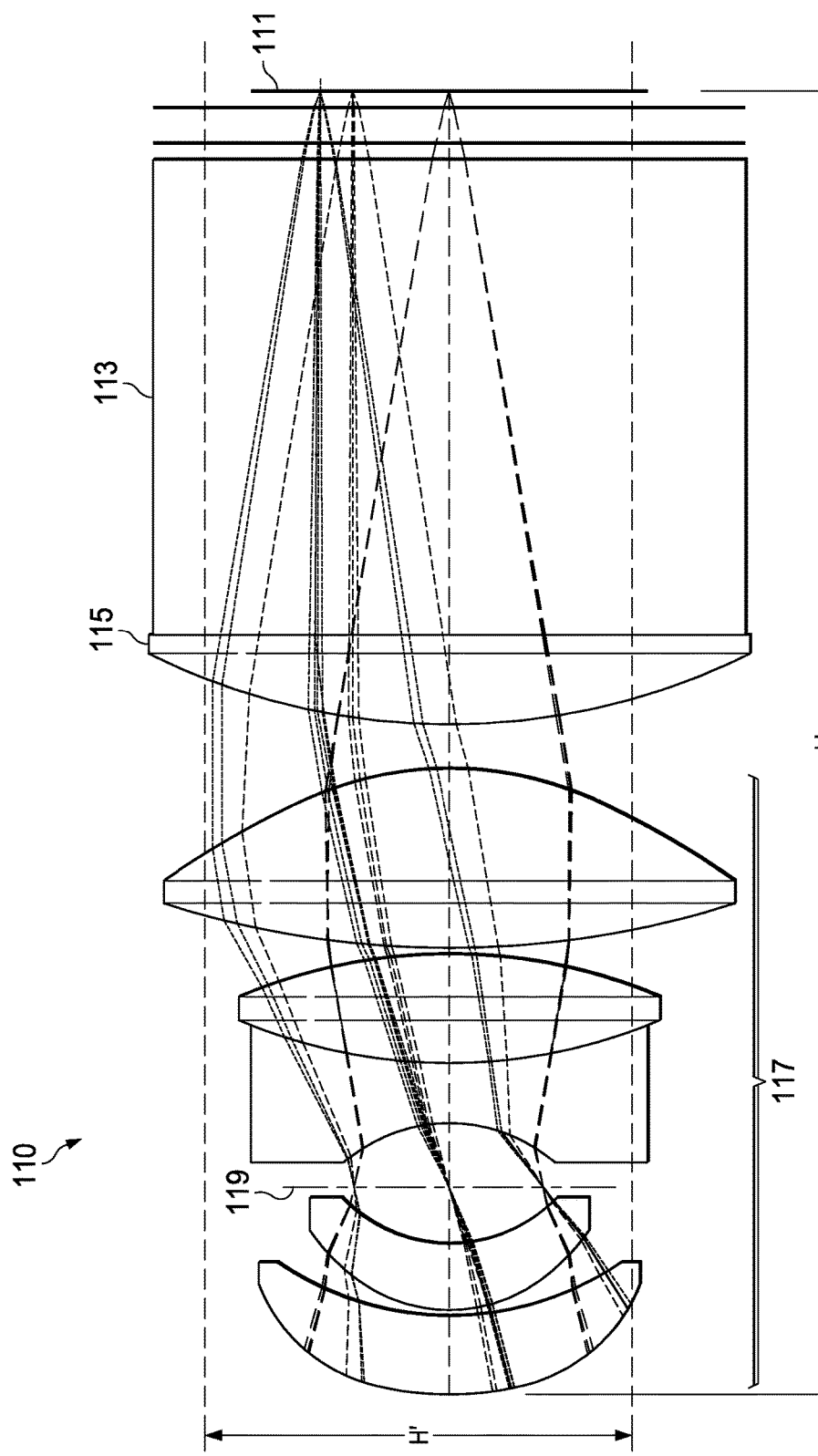
FIG. 5 illustrates in a simplified block diagram an example illustrative arrangement of a novel optical projection portion of the present projection system incorporating certain features of the present application.

FIG. 5 depicts in a block diagram a portion of an optical projection path 110 incorporating features of the present application. In FIG. 5, a prism 113 receives the light from a spatial light modulator 111 (such as a digital micro-mirror device). A field lens 115 is disposed adjacent to the surface where the light rays exit prism 113. In one advantageous arrangement that is contemplated as an aspect of the present application, the field lens 115 is cemented to the prism 113 so as to form an integral component. In yet another alternative arrangement contemplated herein, the prism 113 and the field lens 115 are combined in a single optical component. By arranging the prism 113 and the field lens 115 together as in FIG. 5, the projection light path is shortened, reducing the area needed for the compact optical projection system. The light rays exiting the lens 115 are then input into a projection system 117. In a further aspect of the present application, pupil 119 is shown with only two optical components following the pupil at 119. The advantage of this novel arrangement is using only two optical components after the pupil 119 further reduces the overall device area needed for the projection portion of the compact optical system of the present application when compared to the area needed in the prior known solutions.

Figure 3:
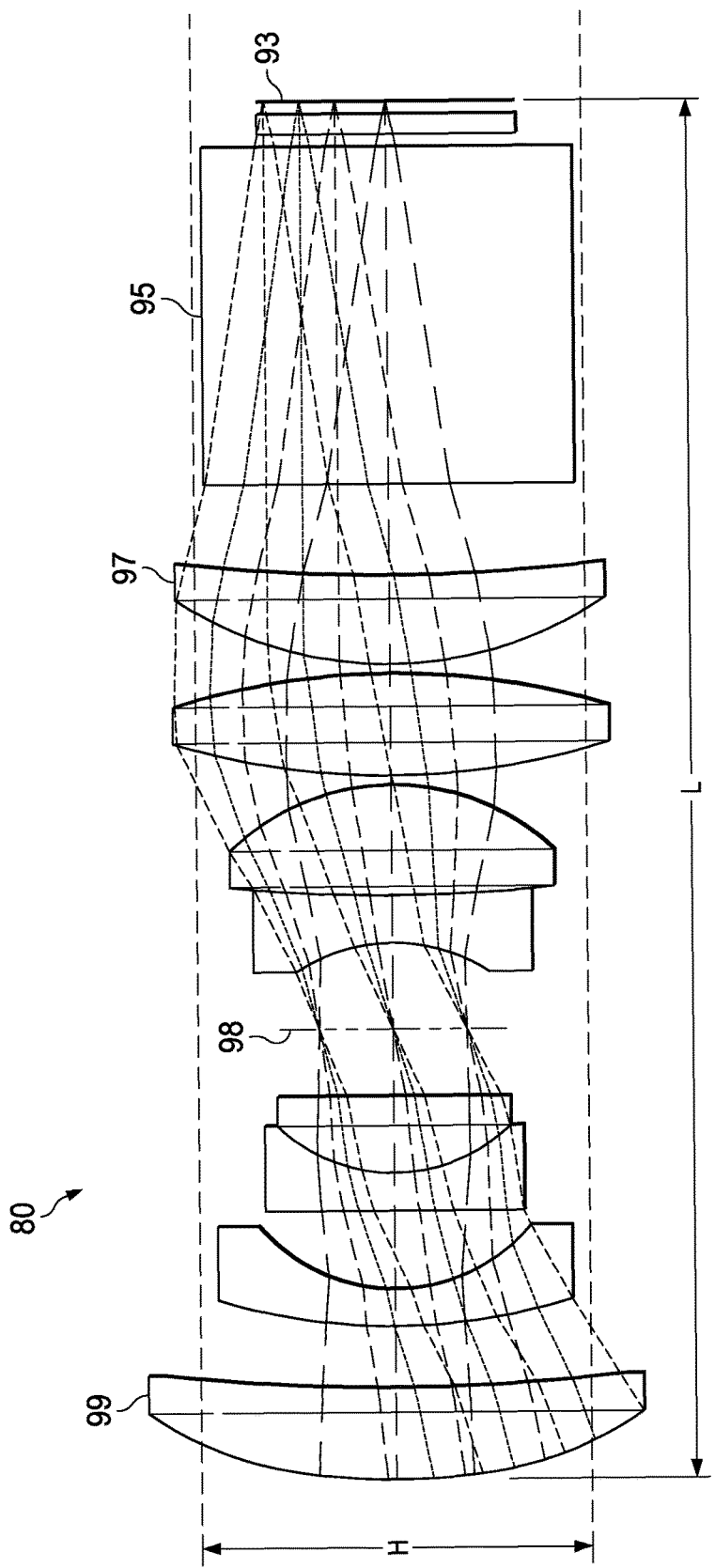
FIG. 3 illustrates in a simplified block diagram a projection portion of a prior known optical projection system.

The horizontal dashed lines in FIG. 5 illustrate an advantage achieved by use of certain aspects of the present application. In FIG. 5, the height "H'" is shown and indicates the height needed to transmit the light rays along the projection path for the projection system 110. In sharp contrast to the prior known projection system illustrated in FIG. 3, the light path from the spatial light modulator 111 to the output of the projection system remains within the height H' of the spatial light modulator, and does not require additional vertical space above, or below, that height. This feature of the arrangements discovered by the inventors of the present application advantageously reduces the volume needed for the projection system in a compact optical projection application. Further, the length "L'" in FIG. 5 is less than the length "L" in FIG. 3. This advantage accrues in aspects of the present application because the front group, the group of optical components disposed after the pupil 119 in FIG. 5, is minimized. In contrast, in the prior known solution shown in FIG. 3, there are several more components used in the front group of the prior optical projection system, which increases the optical path length and increases the volume needed for the prior projection system over the novel example arrangement of FIG. 5.

The novel projection system 110 of FIG. 5 can be used with the other aspects of the present application in a compact optical projection system. However, in another advantageous aspect, the projection system of the present application can be used independently from the illumination system described herein, and advantages can be achieved by using the projection system of the present application such as is illustrated as 110 in FIG. 5 with other illumination systems to advantageously reduce the size of a projection system.

Figure 1:
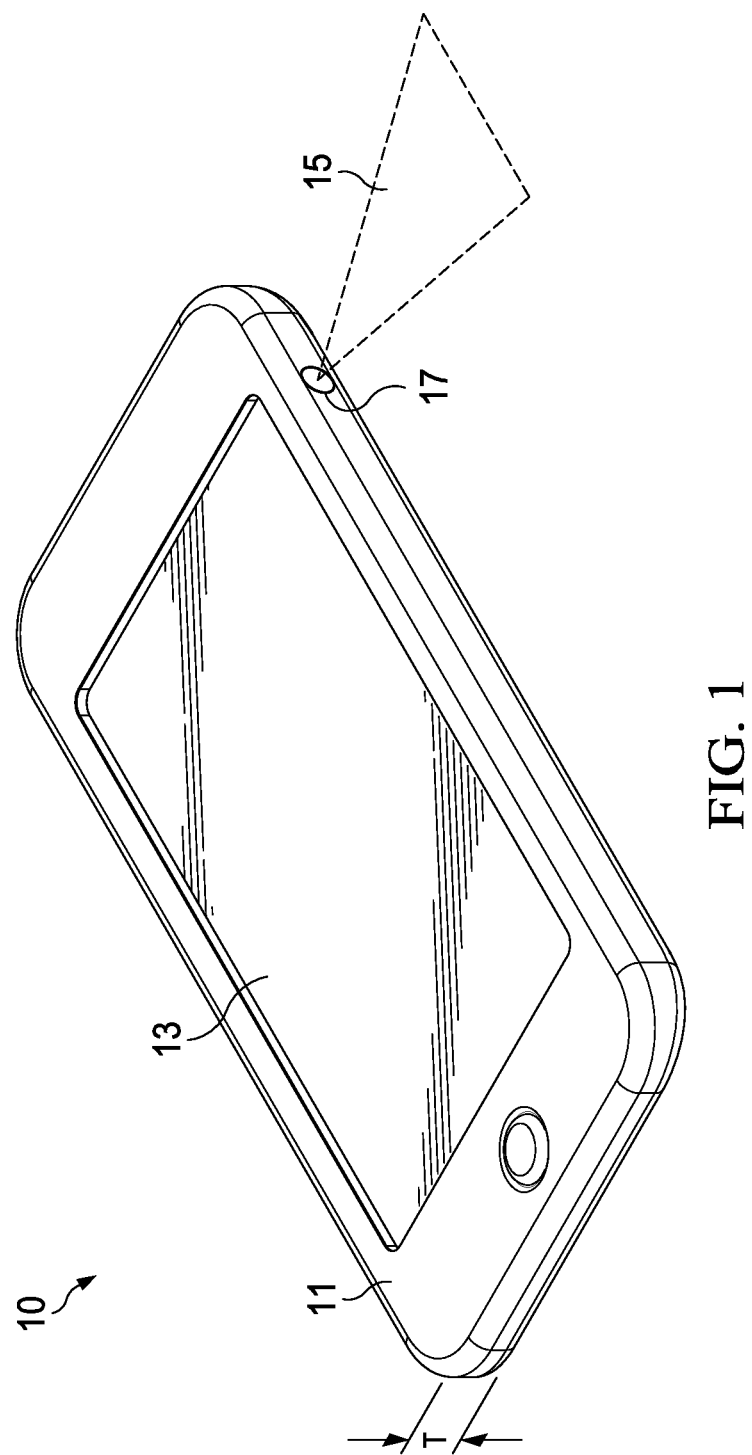
FIG. 1 illustrates in a simplified block diagram a portable device incorporating an embedded optical projection system illustrated for describing various aspects of the present application.
Figure 2:
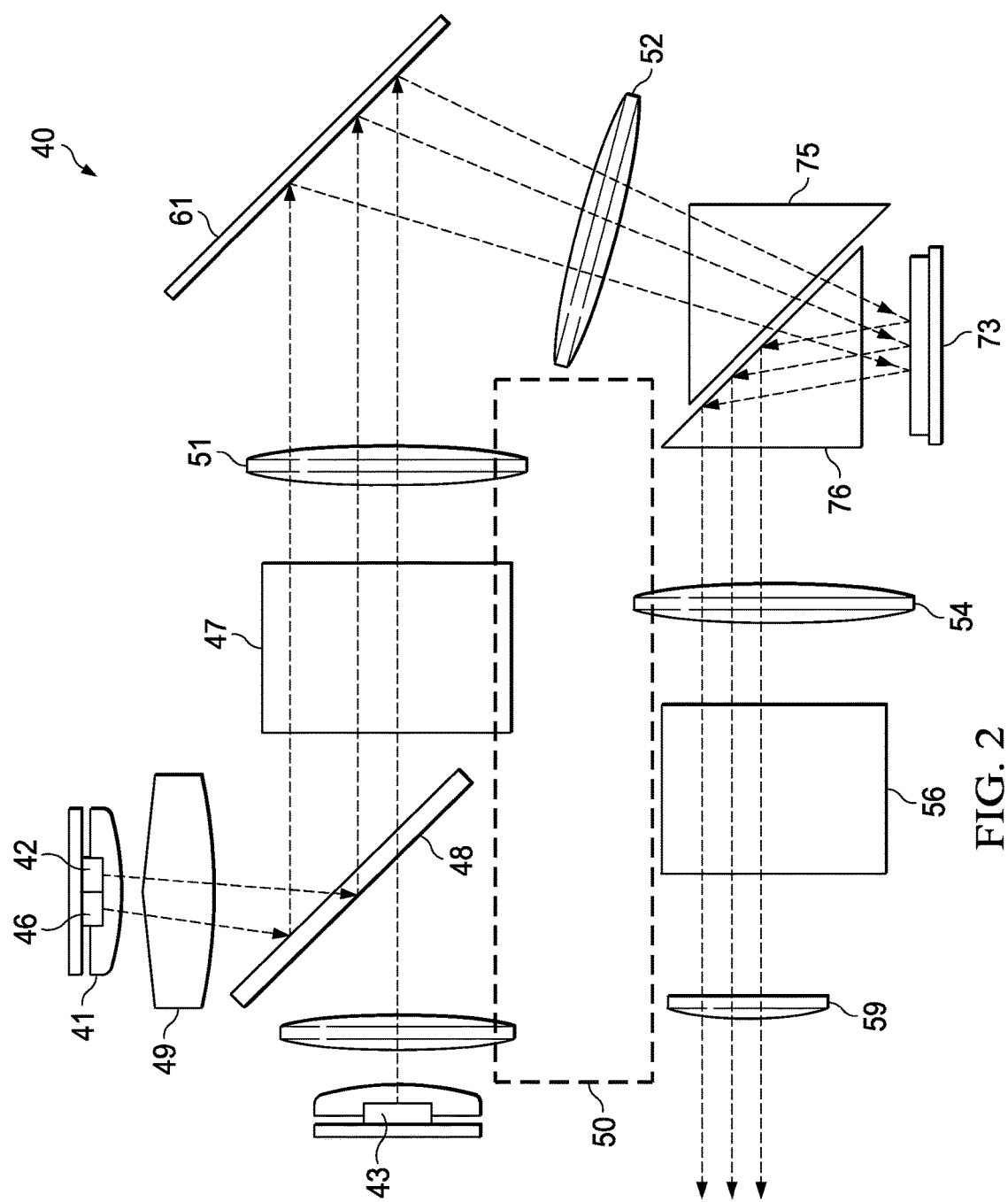
FIG. 2 illustrates in simplified block diagram a prior known optical projection system.
Figure 6:
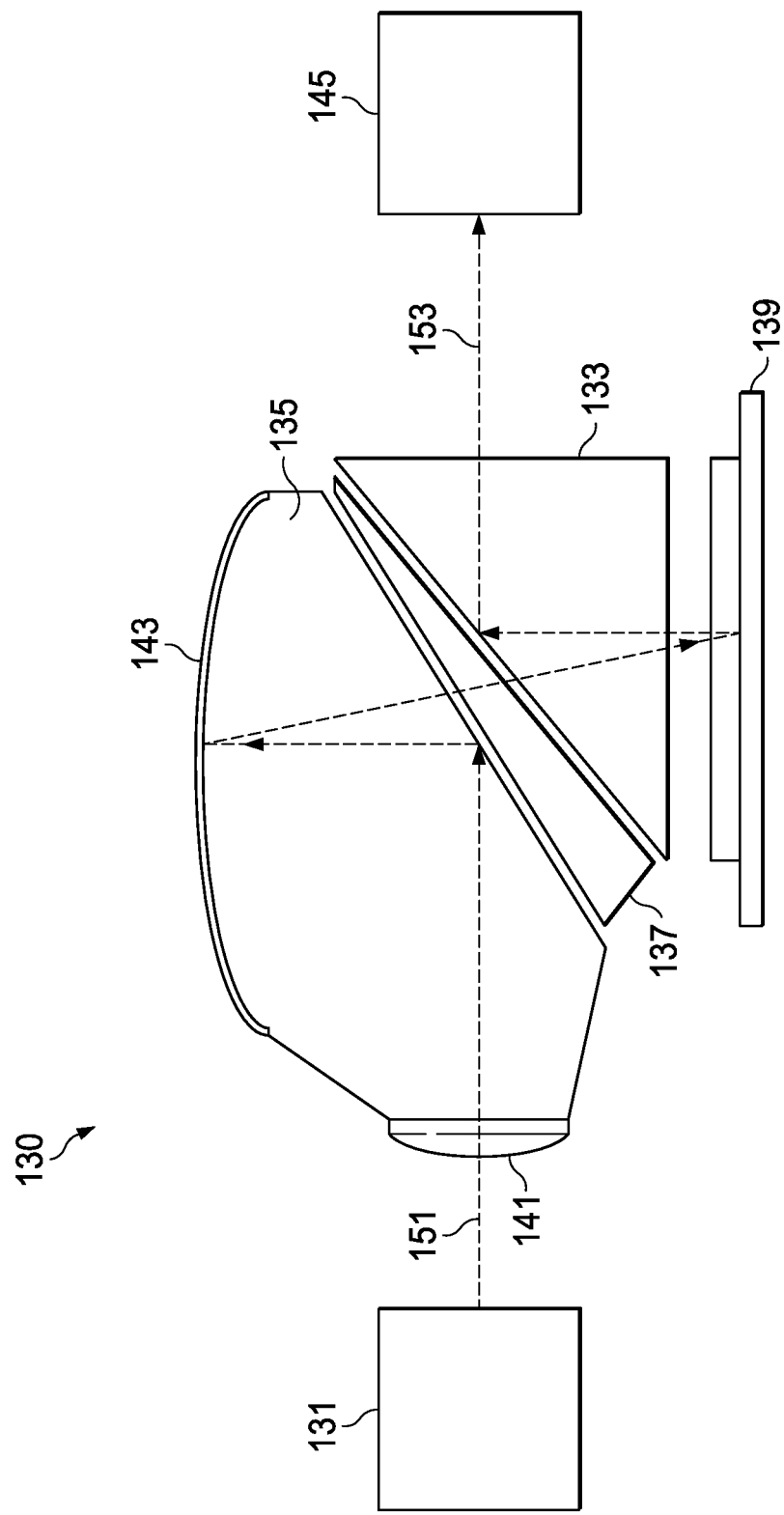
FIG. 6 illustrates in a block diagram a novel optical prism device incorporating certain aspects of the present application.

FIG. 6 depicts, in a simplified block diagram, a plan view of a compact in-line optical projection system 130 incorporating various aspects of the present application. In FIG. 6, the illumination system 131 is shown as a simple block function. Illumination system 131 can be implemented using one or more LEDs, such as shown in FIG. 2, with one or more dichroic plates to reflect and transmit the light, and including a light integrator to from a uniform homogenous illumination beam. However, the present application is not limited to this example illumination system and illumination system 131 can also be implemented using alternative arrangements including, for example, lamps, laser, laser-phosphor, reflectors, color wheels and the like to form additional aspects of the present application.

The light rays 151 from the illumination system 131 enter an in-line prism component that includes a cover prism 135, an optional wedge 137, and a RTIR prism 133. The use of these components as arranged in FIG. 6 advantageously provide a compact in-line architecture for an optical projection system that requires less volume and that requires fewer optical components than the prior known solutions.

In FIG. 6, cover prism 135 advantageously provides several functions in a novel arrangement. A relay optical component 141 is formed as the light entry surface for the cover prism 135. This relay optical component 141 has a curved surface, which is a unique aspect of the present application, in sharp contrast to the flat surface that is normally used as the entry surface for a prism. In an alternative arrangement that is also contemplated as another aspect of the present application, the relay optical component 141 can be formed as a separate component and affixed to the cover prism 135. The illumination light rays 151 enter the cover prism 135 and strike a total internal reflective surface, and are then totally reflected at a 90 degree angle and directed away from the spatial light modulator 139. The light rays next strike the reflective surface 143. In another aspect of the present application, the reflective surface 143 of the cover prism 135 is an asymmetric reflector. The use of an asymmetric reflector surface 143 within the cover prism 135 enables anamorphic control in the illumination optics. The asymmetric reflector 143 provides different optical power along horizontal and vertical directions and can compensate the anamorphic effect caused by the oblique incident angle and the prism set, resulting in high coupling efficiency between illumination and projection within a minimal required optical size. In addition, the use of the reflector surface 143 provides strong power at a slow curve that is desirable in manufacturing.

The reflector surface 143 directs the light rays back through the cover prism 135 towards the spatial light modulator 139. The light rays 151 exit cover prism 135 at an emitting surface and then the illumination light rays transit the wedge 137 into the RTIR prism 133. The illumination light rays transit through RTIR prism 133 and strike a spatial light modulator 139. Spatial light modulator 139 receives image data (not shown) and modulates the illumination light with the image data to form image light rays 153 carrying an image for projection.

The reflected image light rays 153 leave the spatial light modulator 139 and re-enter the RTIR prism 133, and are now totally internally reflected at 90 degrees and then exit the RTIR prism 133 towards the projection optics 145. In another advantageous aspect of the features of the present application, the reflected light rays 153 entering the projection system, shown here simply as a block function 145, exit in a direction that is aligned with, and in the same plane as, the illumination light rays 151 entering the cover prism 135 from the illumination system 131. The cover prism 135 and the RTIR prism 133 thereby enable an in-line RTIR architecture for a compact optical projector system, where the light from the illumination system exits the projection lens in a direction that is in line with the direction of the illumination light rays. This is accomplished in part by the dual folding nature of the cover prism with a TIR and the internal reflector surface, followed by the RTIR prism, the light path transiting two folds of 90 degrees arranged so that in total the projection light path from the spatial light modulator returns to the original direction and is in alignment with the original direction of the illumination light path as it enters the cover prism.

In another advantageous aspect of the present application, optional wedge 137 is used (in sharp contrast to the air gap used between TIR and RTIR prisms in prior known solutions). Wedge 137 provides additional features. By using the wedge 137, the cover prism 135 and the illumination light ray path are moved in a direction (upwards as shown in FIG. 6) away from the package of the spatial light modulator 139, increasing room for the package of a DMD device, for example, that can be used as a spatial light modulator 139. The wedge 137 also allows additional control of the incident angle of the illumination light rays 151 onto the total internal reflection surface of the cover prism 135. Use of an increased incident angle enables the use of a lower index material for cover prism 135, e.g., a plastic optical material. In additional alternative arrangements that are contemplated herein as further aspects of the present application, wedge 137 can be omitted, although the advantageous features that are attained by use of wedge 137 would then be lost in these alternative arrangements.

Because cover prism 135 includes surfaces having a variety of shapes, the use of a plastic optical material lowers cost and simplifies production of the cover prism 135. Molded plastic material can be used to form the cover prism 135, the wedge prism 137, and/or the RTIR prism 133. Alternatively glass and other materials suitable for optical components may be used. Optical materials that can be used include, for example but without limiting the scope of the present application, glass materials such as BK-7, S-TIM2, SF2, SF11, SF57, PBH56, S-LAL54, and alternatively optical plastic materials such as polycarbonate, poly-methyl meth-acrylate (PMMA), cyclic olefin copolymer (COC), or polystyrene. Alternative optical materials can also be used, even if not specifically listed here. The cover prism, wedge, and RTIR prisms can be of the same material or can be formed of different materials. The cover prism can be, in one example, molded of molded glass or molded plastic optical material, in order to lower the costs associated with manufacturing the various shaped surfaces used for the cover prism 135, for example.

The spatial light modulator 139 can be, for example, implemented using a digital micro-mirror device (DMD). DMDs are commercially available from Texas Instruments, Incorporated in various sizes. The currently available DMD devices include VSP ("very small pixel") technology devices, which provide an array of diamond shaped mirrors that tilt on a diagonal axis in a +/−12 degree tilt from a flat position, and TRP ("tilt and roll pixel") technology devices, which provide an array of block shaped mirrors that tilt in a compound motion, first horizontally in one direction, and then vertically in a second direction, at a +/−17 degree tilt from a flat position. DMD devices from other sources can also be used. Each DMD device provides thousands or even millions of micro-mirrors that are individually addressable by changing a stored value in a memory cell associated with each mirror. Analog and digital control ICs for the DMD devices and for providing power to red, green and blue LEDs, and to lens focusing motors, are also available from Texas Instruments, Incorporated for implementing a complete projection system.

In alternative arrangements that also incorporate additional aspects of the present application, other types of spatial light modulator devices can be used to implement the spatial light modulator 139. For example, liquid-crystal-on-silicon (LCoS) devices can be used. These devices, like the digital micro-mirror devices, are reflective elements that can be individually controlled to modulate the image into the projected light rays. LCD spatial light modulators can also be used. These additional alternative arrangements are contemplated by the inventors as providing additional advantageous aspects of the present application and form arrangements that fall within the scope of the appended claims.

Figure 7:
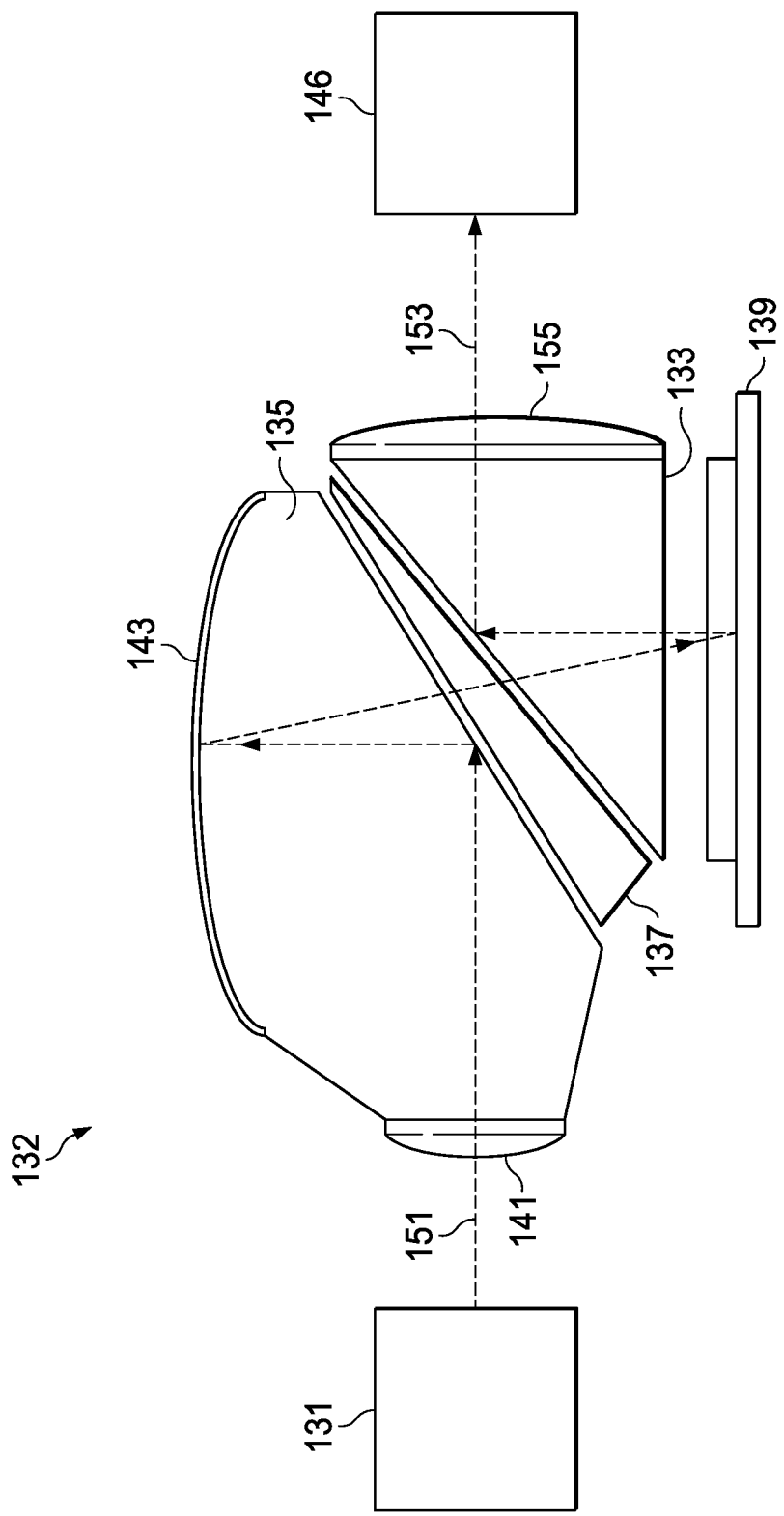
FIG. 7 illustrates in another block diagram an alternative novel optical prism device arrangement incorporating additional aspects of the present application.

FIG. 7 depicts, in another simplified block diagram in a plan view, an alternative arrangement 132 for the compact projection system. In FIG. 7, the components shown in FIG. 6 are again illustrated. In addition, in this alternative arrangement, a field lens component 155 is provided adjacent to or integral with the RTIR prism 133. In one example arrangement that is an aspect of the present application, the field lens component 155 is adhered onto the RTIR prism 133. In another alternative arrangement, field lens component 155 and RTIR prism 133 can be formed as a single optical component, for example using a plastic optical material.

By using the field lens 155, the path for the projection light rays 153 exiting from the RTIR prism is flattened. This flattened light path keeps the image light rays within a height area that is approximately the same vertical height as the RTIR prism, and the image light rays do not extend above the height of the optical components, which makes for a smaller height requirement for the compact optical projection system. The total length of the projection system is also reduced, as the number of optical components needed is reduced by this approach, as shown by comparing the projection optics of FIG. 5 to the projection optics of the prior known solution, illustrated in FIG. 3.

Figure 8:
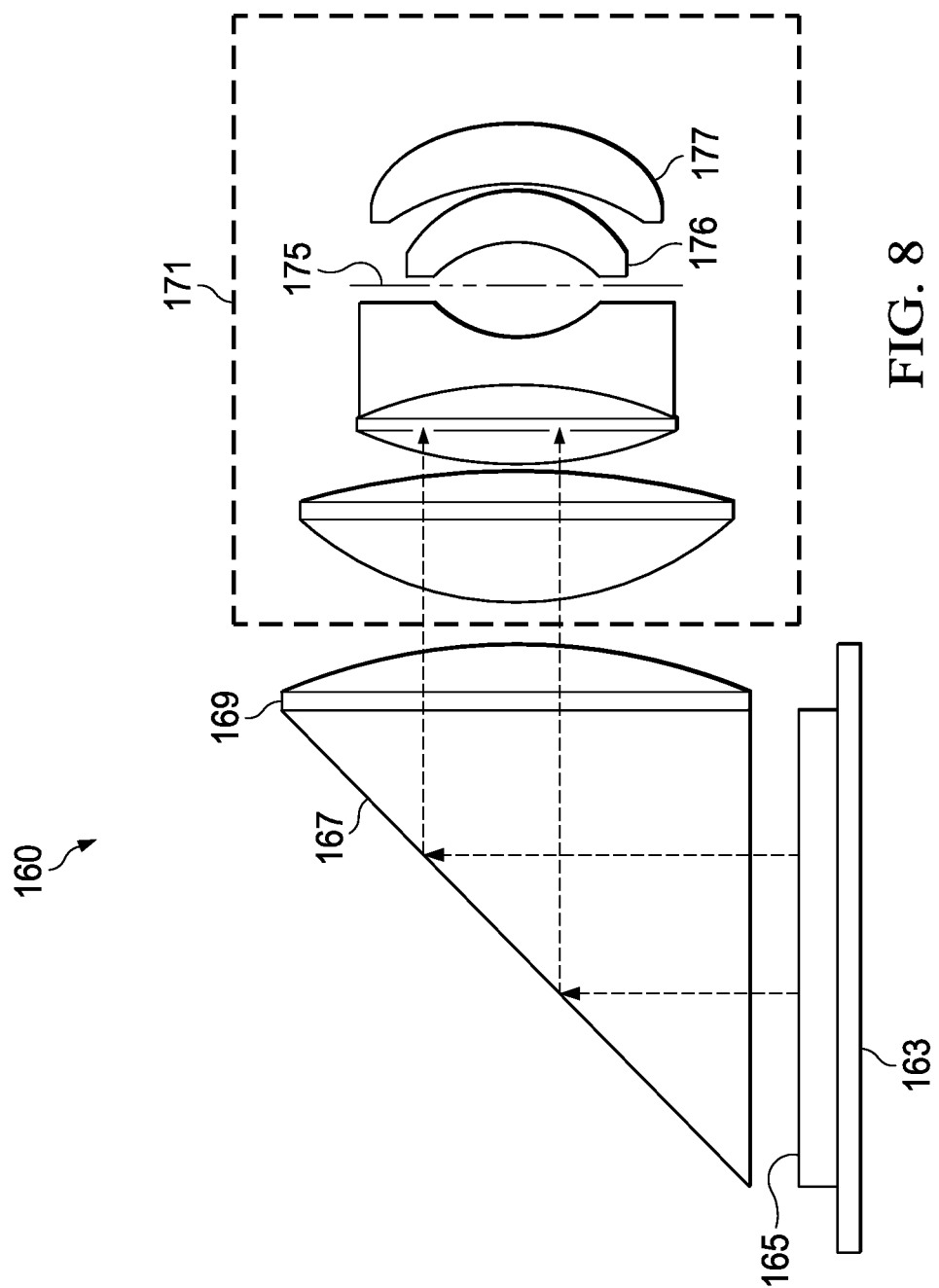
FIG. 8 illustrates in simplified block diagram a novel compact optical projection system incorporating additional aspects of the present application.

The advantageous features of the projection optics of the present application are independent from and may be applied independently of the illumination features. This aspect of the present application is emphasized in FIG. 8. In FIG. 8, a novel projection system 160 is depicted in a simplified block diagram in a plan view. A spatial light modulator 165 is provided, here shown as implemented with a DMD device on a package 163. The light rays leaving the spatial light modulator 165 have been modulated with image data to form an image for projection. The RTIR prism 167 receives the image light rays from the spatial light modulator and a total internal reflection surface in the RTIR prism 167 reflects the rays to a projection optics that begins with a field lens 169 that is disposed on a surface of the RTIR prism 167. The field lens 169 and prism 167 may be formed as a single optical component, or lens 169 may be adhered to the surface of prism 167, as shown. A projection optics system 171 is then positioned to receive the projection light rays emitted from the prism 167. Optics system 171 has a pupil at location 175. The number of components following the pupil, here lens elements 176 and 177, is to be kept to a minimum and these elements should be formed as small as possible to maintain the compactness of the optical projection system. In this example, for instance, only two lens elements 176, 177 follow the pupil 175 in the projection optics system 171. In another aspect of the present application, the inventors have discovered that a way to achieve this advantage is to constrain the element count and the size of the lenses after the pupil 175. This constraint on the elements following the pupil can be done during the lens design process using a known lens design software tool. Since the lens count and element sizes after the pupil are constrained, the designer should give the software more design freedom (more variability in lens shape, material, etc.) to the elements placed before the pupil 175, so that the software lens design tool can achieve both the desired form factor and the desired performance.

Although the projection system 160 in FIG. 8 can be used with the cover prism, and the optional wedge, as described above in the discussion of FIGS. 6 and 7, in an alternative arrangement these projection system components can also be advantageously used independently with another illumination system. After the illumination light rays strike the spatial light modulator, such as 165, the remaining components in the optical system can incorporate the advantageous features of the projection system aspects of this application independent of the illumination system that is used, and so can form a more compact optical projection system than achieved using the prior known solutions. Using the projection system 160 with other illumination systems thus forms additional alternative arrangements which are also contemplated by the inventors as additional advantageous aspects of the present application, and which fall within the scope of the appended claims.

Figure 9:
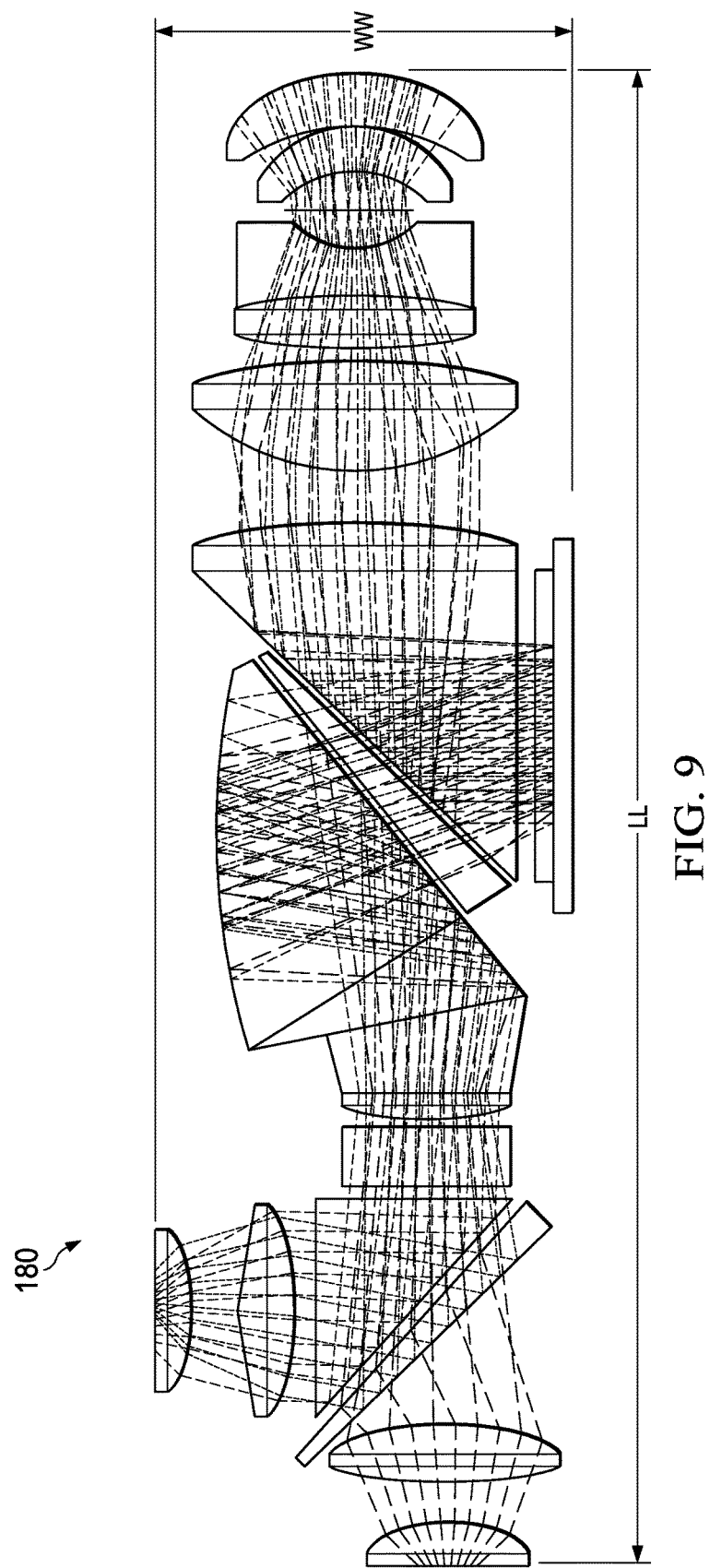
FIG. 9 illustrates in a plan view an example implementation of a novel compact optical projection system incorporating various features of the present application.
Figure 10:
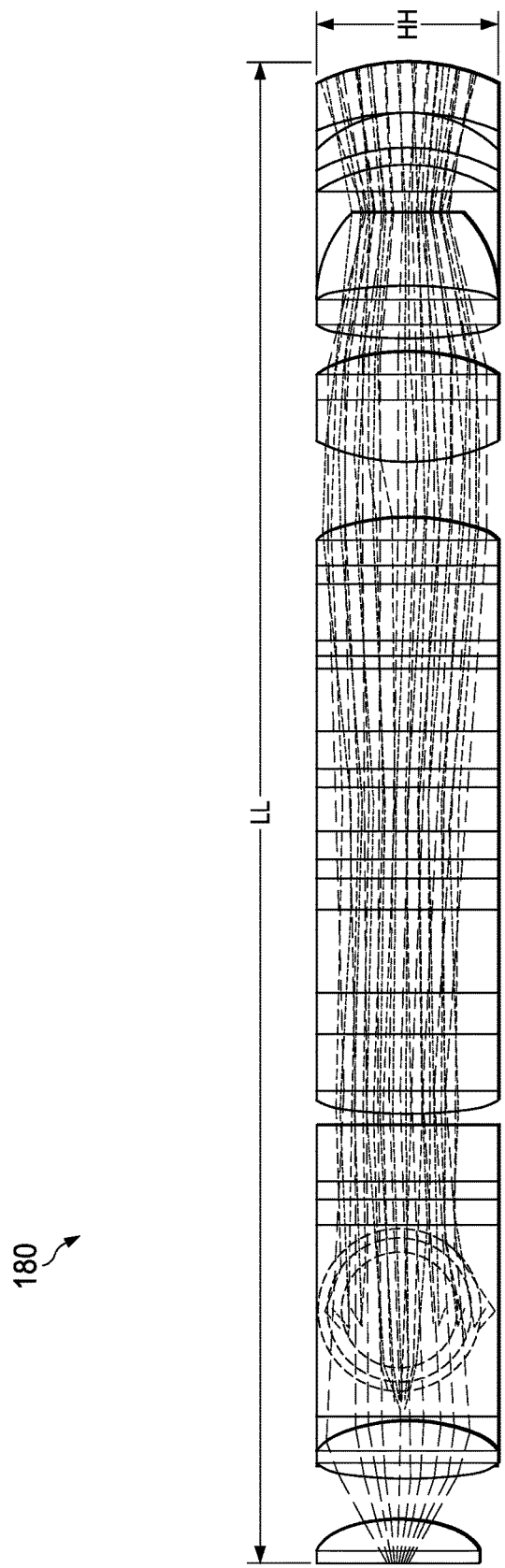
FIG. 10 illustrates in a side view the example compact optical projection system of FIG. 9.

In an illustrative compact optical projection system utilizing the novel features of the illumination system and the projection system described above, a total compact optical system volume of only 2.1 cubic centimeters was achieved. FIGS. 9 and 10 depict the example system 180 in a top or plan view (FIG. 9) and a side view (FIG. 10).

In FIGS. 9 and 10, the length 'LL' of the example system 180 illustrated as using the features of the cover prism, the wedge, the RTIR prism and the projection systems described above was reduced to a length of 40 millimeters, a width 'WW' of 11 millimeters, and as shown in FIG. 10, a height 'HH' of 4.8 millimeters, for a total volume of 2.1 cubic centimeters (40*11*4.8 millimeters). The geometric efficiency achieved using red, green and blue LED illumination sources was 69.2% for green, 67.2% for red, and 68.8% for blue. The use of molded plastic or molded glass optical components can ensure that the compact optical projection system of this present application is low in manufacturing costs. However, the arrangements are not limited to particular optical materials, and alternative materials can be used to form additional arrangements that are also contemplated as aspects of the present application.

Figure 11:
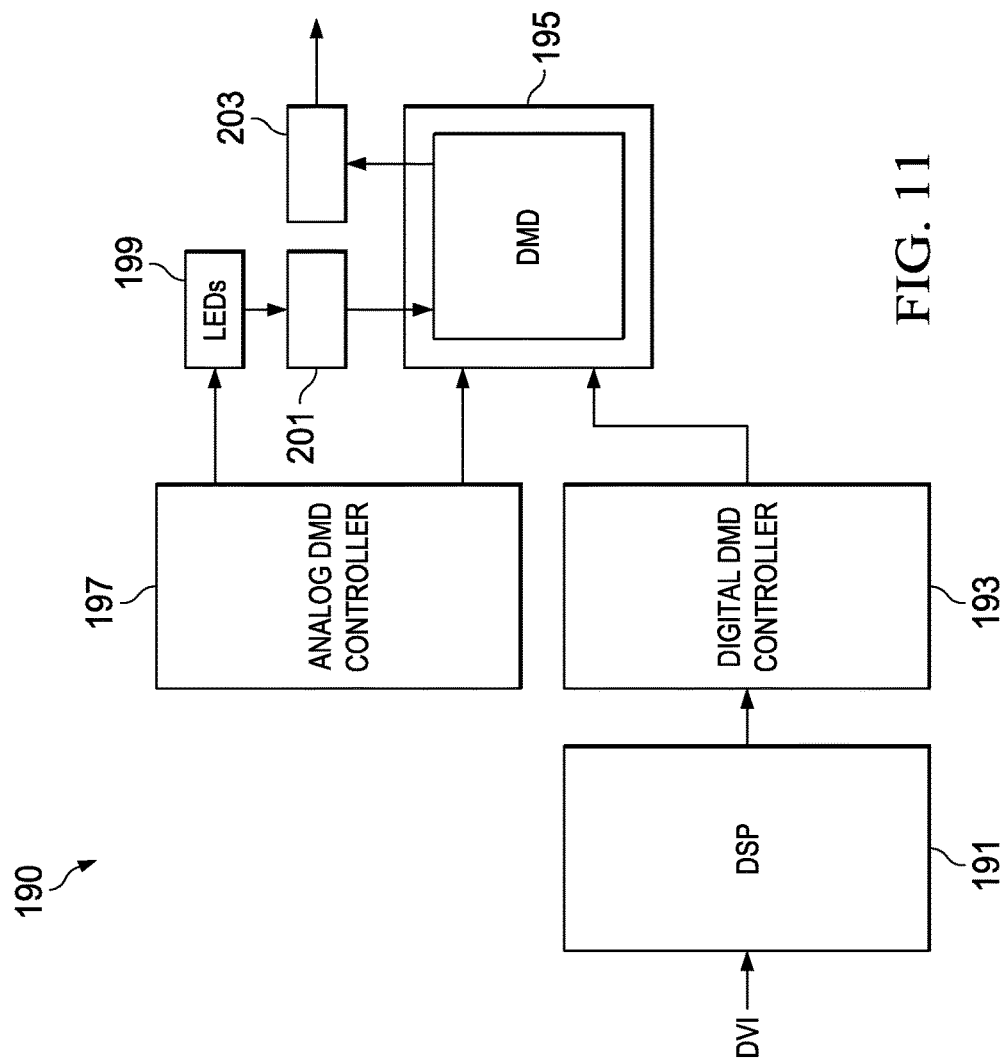
FIG. 11 depicts in a simplified circuit diagram a novel compact optical projection system incorporating features of the present application.

In addition to the optical components described above, a projection system using a spatial light modulator such as a DMD requires various electrical components to get the digital video information for display into the spatial light modulator, and to control the illumination sources, such as LEDs or lamps, to use with the spatial light modulator. FIG. 11 depicts in a simple circuit diagram a typical arrangement 190 for use with the compact optical projection system described above. A microprocessor, mixed signal processor, digital signal processor, microcontroller or other programmable device 191 is provided and executes instructions that cause it to output digital video signals for display. A variety of sources may provide the digital video signals labeled DVI in the figure, including internet browsers, stored files in video cards, flash cards, USB drives and the like, cameras, and camcorders, etc. The microprocessor 191 is coupled to a digital DMD controller 193 which is another digital video processing integrated circuit. An analog controller IC 197 is also provided. The analog control IC 197 controls the intensity and power to the LEDs 199. The DMD controller provides digital data to the DMD 195 for modulating the illumination light that strikes the DMD surface, and the analog DMD controller 197 also provides power and analog signals to the DMD 195. The light rays from the illumination sources LEDs 199 are input to the illumination components 201 such as the cover prism and wedge described above, and strike the DMD 195. The reflected light for projection leaves the surface of the DMD 195 and travels into the projection optics 203 as described above. Together the integrated circuits 193, 197 cause the DMD 195 and the optical components 199, 201, 203 to operate to project the digital video signals as an image.

Example integrated circuits that can be used in the circuit shown in FIG. 11 include mixed signal processors that are available from Texas Instruments, Incorporated such as any of the MSP430AFE family of processors. DMD controller ICs that can be used include, for example, the DLPC3430 DMD controller, and the DLPC2601 ASIC device that can provide both digital and analog controller functions. Analog DMD controller devices from Texas Instruments, Incorporated that can be used include the DLPA2000 device. LED controller devices can be used to power on and off the RGB LEDs, for example.

The spatial light modulators can be implemented with DMD devices from Texas Instruments, Incorporated such as the DLP2010DMD, which is a 0.2 inch diagonal device that provides wide VGA (WVGA) resolution. Many other DMD devices are available. Although these Texas Instruments Incorporated devices are listed here as currently available examples of integrated circuits that can be used with the arrangements of the present application, many other integrated circuits can also be used and the illustrative examples listed here do not limit the scope of this application, nor do they limit the scope of the appended claims.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. An apparatus for image projection, comprising:
at least one illumination device;
a cover prism comprising a curved surface positioned to receive illumination light rays emitted by the at least one illumination device, a total internal reflection surface positioned to internally reflect the light rays received through the cover prism towards an asymmetric reflector surface formed within the cover prism and positioned opposite the total internal reflection surface, the asymmetric reflector surface configured to reflect the received light rays back through the cover prism and out of an emitter surface of the cover prism;
a spatial light modulator having a surface for receiving illumination light rays from the emitter surface of the cover prism and configured for modulating the illumination light rays with image data to form image light rays; and
a reverse total internal reflection (RTIR) prism positioned between the spatial light modulator and the emitter surface of the cover prism and comprising an output surface positioned to allow illumination light rays emitted from the cover prism to travel through the RTIR prism to the spatial light modulator, and further comprising a total internal reflection surface positioned to receive the image light rays reflected from the spatial light modulator and configured to totally internally reflect the image light rays from the output surface of the RTIR prism and into a light projection optics device;
the light projection optics device positioned to receive the image light rays from the output of the RTIR prism and to project the image light rays, wherein the light projection optics device comprises: a physical pupil; a series of optical elements arranged to direct the image light rays through the physical pupil; and at least one lens element, but no more than two lens elements, disposed in an image light path after the physical pupil to project the image light rays, wherein a height of each lens element disposed in the image light path after the physical pupil is less than a height of the tallest optical element in the series of optical elements.

2. The apparatus of claim 1, and further comprising: a wedge positioned between the cover prism and the RTIR prism and configured to transmit light rays from the emitter surface of the cover prism into the RTIR prism and towards the spatial light modulator.

3. The apparatus of claim 1, wherein the cover prism is configured to provide a folded optical path between the illumination device and the spatial light modulator.

4. The apparatus of claim 1, wherein the curved surface of the cover prism further comprises relay optics.

5. The apparatus of claim 1, wherein the illumination light rays enter the cover prism in a first direction, and the image light rays exit the light projection optics device in the same first direction.

6. The apparatus of claim 1, wherein the cover prism is formed of a molded optical material that is one selected from the group consisting essentially of moldable glass materials and plastics including polycarbonate, PMMA, OCO, polystyrene.

7. The apparatus of claim 1, wherein the cover prism further comprises a mirror surface formed on a portion of an exterior surface to form the asymmetric reflective surface.

8. The apparatus of claim 1, wherein the RTIR prism further comprises a field lens disposed adjacent the output surface of the RTIR prism.

9. The apparatus of claim 8 wherein the field lens is adhered to the output surface of the RTIR prism.

10. The apparatus of claim 1, wherein the at least one illumination device further comprises an illumination device that is one selected from the group consisting essentially of an LED, incandescent lamp, laser, and laser phosphor.

11. The apparatus of claim 1, wherein the at least one illumination device further comprises at least three LEDs, one red, one green and one blue.

12. An in-line prism system for optical projection, comprising:
a cover prism having a portion that forms a curved surface for receiving illumination light rays from an illumination system, the cover prism further comprising a total internal reflection surface positioned opposite the portion and configured to reflect illumination light rays across the cover prism to an asymmetric reflective surface formed within the cover prism, the asymmetric reflective surface configured to reflect the illumination light rays back across the cover prism and out of the cover prism; and
an RTIR prism positioned to receive the illumination light rays from the cover prism and to emit the illumination light rays to a spatial light modulator positioned adjacent a first surface of the RTIR prism, and further comprising a total internal reflective surface positioned opposite the spatial light modulator and configured to receive image light rays from the spatial light modulator and to reflect the image light rays out of a second surface of the RTIR prism towards projection optics; and
the projection optics positioned to receive the image light rays from the second surface of the RTIR prism and to project the image light rays, wherein the projection optics comprise: a physical pupil; a series of optical elements arranged to direct the image light rays through the physical pupil; and at least one lens element, but no more than two lens elements, disposed in an image light path after the physical pupil to project the image light rays, wherein a height of each lens element disposed in the image light path after the physical pupil is less than a height of the tallest optical element in the series of optical elements;
wherein the illumination light rays enter the cover prism in a first direction, and the image light rays exit the RTIR prism in the same first direction and aligned with the illumination light rays.

13. The in-line prism system of claim 12, and further comprising a wedge prism disposed between the cover prism and the RTIR prism.

14. The in-line prism system of claim 12, wherein the portion that forms a curved surface of the cover prism further comprises an optical relay component.

15. The in-line prism system of claim 12, wherein the cover prism comprises a molded material that is one selected from the group consisting essentially of moldable glass materials and plastics including polycarbonate, PMMA, OCO, polystyrene.

16. A portable device having an embedded compact optical projection system, comprising:
a processor having digital video output signals for display as an image;
a spatial light modulator coupled to the processor for converting the digital video output signals into images for projection by modulating illumination light;
at least one illumination source configured to emit illumination light rays;
a cover prism positioned to receive the illumination light rays into a curved surface, the cover prism further comprising a total internal reflection surface disposed to receive the illumination rays and to reflect the light rays at a 90 degree angle, and an asymmetric reflective surface within the cover prism positioned opposite the total internal reflection surface and configured to reflect the illumination light rays back across and out of the cover prism towards a spatial light modulator;
the spatial light modulator configured to receive the illumination light rays and for reflecting the illumination light rays modulated with images for projection to form image light rays; and
an RTIR prism positioned between the cover prism and the spatial light modulator and configured to receive the image light rays through a first surface adjacent the spatial light modulator, the image light rays traveling through the RTIR prism to a total internal reflection surface disposed opposite the spatial light modulator and configured to totally reflect the image light rays at a 90 degree angle and out of a second surface of the RTIR prism towards projection optics;
the projection optics positioned to receive the image light rays from the second surface of the RTIR prism and to project the image light rays from the portable device, wherein the projection optics comprise: a physical pupil; a series of optical elements arranged to direct the image light rays through the physical pupil; and at least one lens element, but no more than two lens elements, disposed in an image light path after the physical pupil to project the image light rays, wherein a height of each lens element disposed in the image light path after the physical pupil is less than a height of the tallest optical element in the series of optical elements.

17. The portable device of claim 16, wherein the illumination light rays enter the cover prism at a first direction, and the image light rays exit the RTIR prism in the same first direction and are aligned with the illumination light rays.

18. The portable device of claim 16, wherein the portable device is one taken from the group consisting essentially of a smartphone, a tablet computer, a portable projector, a wearable projector, a camera, a camcorder and a laptop.

19. The portable device of claim 16, wherein the spatial light modulator is one taken from the group consisting essentially of a digital micro-mirror device and an LCoS device.

* * * * *